United States Patent
Shu

(10) Patent No.: US 9,654,722 B2
(45) Date of Patent: May 16, 2017

(54) TELEVISION CONTROL CIRCUIT AND TELEVISION

(71) Applicant: SHENZHEN TCL NEW TECHNOLOGY CO., LTD, Shenzhen, Guangdong (CN)

(72) Inventor: Xiangcheng Shu, Guangdong (CN)

(73) Assignee: SHENZHEN TCL NEW TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 15/037,324

(22) PCT Filed: Dec. 13, 2014

(86) PCT No.: PCT/CN2014/093780
§ 371 (c)(1),
(2) Date: May 17, 2016

(87) PCT Pub. No.: WO2016/026244
PCT Pub. Date: Feb. 25, 2016

(65) Prior Publication Data
US 2016/0277702 A1    Sep. 22, 2016

(30) Foreign Application Priority Data

Aug. 21, 2014 (CN) .................... 2014 2 0476300 U

(51) Int. Cl.
*H04N 5/63* (2006.01)
*H04N 5/44* (2011.01)
(Continued)

(52) U.S. Cl.
CPC ........... *H04N 5/63* (2013.01); *G06K 9/00362* (2013.01); *H04N 5/33* (2013.01);
(Continued)

(58) Field of Classification Search
CPC .. H04N 5/63; H04N 5/33; H04N 5/44; H04N 5/4401; H04N 5/4403; G06K 9/00362
(Continued)

(56) References Cited

U.S. PATENT DOCUMENTS

| | | | | |
|---|---|---|---|---|
| 2004/0051813 A1* | 3/2004 | Marmaropoulos | ...... | G09G 5/00 348/730 |
| 2008/0062333 A1* | 3/2008 | Iwahashi | .................. | H04N 5/63 348/730 |
| 2013/0155332 A1* | 6/2013 | Wei | .......................... | H04N 5/63 348/730 |

FOREIGN PATENT DOCUMENTS

| | | |
|---|---|---|
| CN | 1682272 A | 10/2005 |
| CN | 101860704 A | 10/2010 |

(Continued)

OTHER PUBLICATIONS

International Search Report of PCT Patent Application No. PCT/CN2014/093780 issued on May 28, 2015.

*Primary Examiner* — Sherrie Hsia

(57) ABSTRACT

Disclosed is a television control circuit comprising a display screen, a power supply board, a human body detection module and a main board. The power supply board is connected to a power supply input end of the main board and a power supply input end of the display screen. A detection output end of the human body detection module is connected to a detection input end of the main board. Control output ends of the main board are connected to the power supply board and display screen. The main board controls the on-off state of the display screen according to the detection result obtained by the human body detection module that whether a user is watching the television. A television is also disclosed.

16 Claims, 2 Drawing Sheets

(51) Int. Cl.
    *G06K 9/00*     (2006.01)
    *H04N 5/33*     (2006.01)
    *H04N 21/422*     (2011.01)
    *H04N 21/442*     (2011.01)
    *H04N 21/443*     (2011.01)
    *H04N 5/57*     (2006.01)
    *H04N 5/60*     (2006.01)

(52) U.S. Cl.
    CPC ... *H04N 21/42201* (2013.01); *H04N 21/4432* (2013.01); *H04N 21/4436* (2013.01); *H04N 21/44218* (2013.01); *H04N 5/57* (2013.01); *H04N 5/60* (2013.01)

(58) Field of Classification Search
    USPC ............ 348/725, 730, 731, 734; 725/12, 10
    IPC ................................................ H04N 5/63,5/44
    See application file for complete search history.

(56) References Cited

FOREIGN PATENT DOCUMENTS

| | | |
|---|---|---|
| CN | 102104745 A | 6/2011 |
| CN | 201957154 U | 8/2011 |
| CN | 203352690 U | 12/2013 |

\* cited by examiner

TELEVISION CONTROL CIRCUIT AND TELEVISION

FIELD OF THE INVENTION

The present application relates to the field of electronic technology, and in particular, to a television control circuit and a television.

BACKGROUND OF THE INVENTION

Currently, along with the increasing of people pursuing energy-saving and low-carbon lives, higher energy-saving performance of products is required. However, conventional television has disadvantages in energy-saving: when users aren't in front of the television temporarily for the reason that they have other commitments or listen to the television simultaneously, the display screen of the television will continuously play. Under the circumstances, the television just need to play sound and the display screen doesn't need to work. The energy consumption by the display screen accounts for a great deal, such as, when a 100 W LED-television works, the energy consumption of the display screen accounts for 60% of the total energy consumption. This results in a great deal of electric energy wasting when users aren't in front of the television.

SUMMARY OF THE INVENTION

An embodiment of the present disclosure discloses a television control circuit which includes:
 a display screen;
 a power supply board;
 a human body detection module; and
 a main board;
 wherein, the power supply board is connected to a power supply input end of the main board and a power supply input end of the display screen, a detection output end of the human body detection module is connected to a detection input end of the main board, control output ends of the main board are connected to the power supply board and the display screen; the main board controls the on-off state of the display screen according to the detection result obtained by the human body detection module that whether a user is watching the television.

Preferably, the display screen includes a drive board and a T-CON board, a power supply input end of the display screen is connected to the power supply board, a power supply input end of the T-CON board is connected to the main board.

Preferably, the main board includes a main control chip, a first power supply control circuit for controlling power supply state of the T-CON board, a second power supply control circuit for controlling power supply state of the drive board. Therein, a detection input end of the main control chip is connected to a detection output end of the human body detection module; a control output end of the main control chip is respectively connected to a control input end of the first power supply control circuit and a control input end of the second power supply control circuit; the control output end of the first power supply control circuit is connected to the power supply input end of the T-CON board; a control output end of the second power supply control circuit is connected to the power supply board.

Preferably, the first power supply control circuit includes a power supply input end, a power supply control input end, a power supply control output end, a first resistance, a second resistance, a third resistance, a fourth resistance, a first capacitance, a second capacitance, a MOS transistor and a triode.

Of which, a first end of the second resistance works as the power supply input end; the power supply control input end is connected to the main control chip; the second end of the second resistance is connected to a base of the triode; a first end of the third resistance is connected to the base of the triode; the second end of the third resistance is connected to the ground; the first capacitance and third resistance are in parallel connection; an emitter of the triode is connected to the ground by passing the fourth resistance, and connected to the power supply control output end by passing the second capacitance.

Wherein, the power supply control output end is connected to the power supply input end of the T-CON board; the first end of the first resistance is connected to the power supply input end, the second end of the first resistance is connected to a collector of the triode; a source of the MOS transistor is connected to the power supply input end, and a drain of the MOS transistor is connected to the power supply control output end; a grid electrode of the MOS transistor is connected to the collector of the triode.

Preferably, the MOS transistor is a PMOS transistor and the triode is a NPN transistor.

Preferably, the second power supply control circuit includes a fifth resistance; the first end of the fifth resistance is connected to the main control chip, and the second end of the fifth resistance is connected to the power supply board.

Preferably, the human body detection module is a shooting system.

Preferably, the human body detection module is a infrared detection system.

Preferably, the television control circuit further includes a speaker for generating sound, the speaker is connected to the main board.

Another embodiment of the present disclosure discloses a television including a television control circuit which includes:
 a display screen;
 a power supply board;
 a human body detection module; and
 a main board;
 wherein, the power supply board is connected to a power supply input end of the main board and a power supply input end of the display screen, a detection output end of the human body detection module is connected to a detection input end of the main board, control output ends of the main board are connected to the power supply board and the display screen; the main board controls the on-off state of the display screen according to the detection result obtained by the human body detection module that whether a user is watching the television.

A television is also disclosed. The main board of the television control circuit of the present disclosure can automatically control the power supply state of the display screen of the television according to the detection result, obtained by the human body detection module, of characteristic information of users in front of the television, which achieves energy saving.

There and other features, aspects, and advantages of invention will be apparent to those skilled in the art from the following detailed description of embodiments, taken together with the drawings and the claims that follow.

DETAILED DESCRIPTION OF THE EMBODIMENTS

It should be understood that the specific embodiments described herein are merely used for describing the present disclosure, but are not intended to limit the present disclosure.

Figure 1:
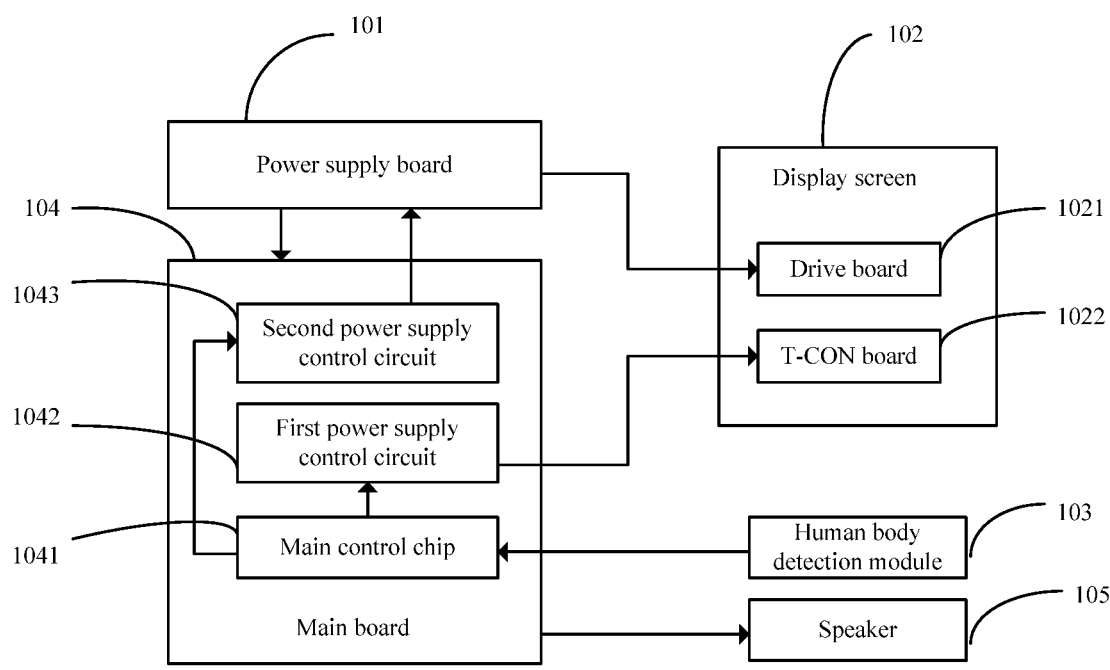
FIG. 1 is a schematic diagram of a television control circuit according to an embodiment of the present disclosure.

Referring to FIG. 1, FIG. 1 is a schematic drawing of the television control circuit according to an embodiment of the present disclosure.

An embodiment of the present disclosure discloses a television control circuit including a power supply board 101, a display screen 102, a human body detection module 103, a main board 104, and a speaker 105.

The power supply board 101 may be configured for supplying power to the television control circuit of the present disclosure, to the display screen 102 and the main board 104 as well.

The display screen 102 may be configured for displaying television programs.

The display screen 102 includes a backlight module (not shown) for driving the display screen 102, a T-CON board 1022 for controlling displaying of the display screen 102, the T-CON board 1022 may be also known as a time sequential control board.

The human body detection module 103 may be configured for detecting characteristic information of users in front of the television.

According to an embodiment of the present disclosure, the characteristic information of users detected by the human body detection module 103 may be an image signal, or an infrared signal. If it is an image signal, the human body detection module 103 may be a shooting system, which herein prefers a non-limiting system such as a camera. If it is an infrared signal, the human body detection module 103 may be an infrared detection system.

In some embodiments, if the human body detection module 103 is a shooting system, which may take images of users in front of the television. When users aren't in front of the television, then the shooting system may output a signal (such as a low electrical level signal) to the main board 104, so that the main board 104 may control the display screen 102 in the state of power off, and the display screen 102 is not operating. If the human body detection module 103 is an infrared detection system, which may detect infrared signal of users in front of the television. When users aren't in front of the television, or have a certain distance from the television, the infrared detection system is skipping detecting infrared signal of users, then the infrared detection system may output a signal (such as a low electrical level signal) to the main board 104, so that the main board 104 may control the display screen 102 in the state of power off, and the display screen 102 is not operating.

The main board 104 may be configured for controlling the state of the power supply board 101 supplying power to the display screen 102 according to the detection result obtained by the human body detection module 103, and controlling the state of the main board 104 supplying power to the T-CON board 1022 in the display screen 102.

In some embodiments, the main board 104 includes a main control chip 1041; a first power supply control circuit 1042 for controlling state of the main board 104 supplying power to the T-CON board 1022; a second power supply control circuit 1043 for controlling state of the power supply board 101 supplying power to the drive board 1021.

In some embodiments, according to the detection result obtained by the human body detection module 103, of characteristic information that whether users are in front of the television, the main control chip 1041 may output corresponding signals to the first power supply control circuit 1042 and the second power supply control circuit 1043, then the first power supply control circuit 1042 may control the state of the main board 104 supplying power to the T-CON board 1022 in the display screen 102 and the second power supply control circuit 1043 may control the state of the power supply board 101 supplying power to the drive board 1021 in the display screen 102. Therefore the on-off state of the display screen 102 is realized to control.

The speaker 105 is for generating sound.

In some embodiments, the power supply board 101 is connected to a power supply input end of the main board 104 and a power supply input end of the display screen 102, so as to supply power to the main board 104 and the display screen 102. A detection output end of the human body detection module 103 is connected to a detection input end of the main board 104, in an embodiment, the detection output end of the human body detection module 103 is the detection input end of the main board 104; the control output end of the main control chip 1041 in the main board 104 is the output end of the main board 104; the control output ends of the main control chip 1041 are respectively connected to the control input end of the first power supply control circuit 1042 and the control input end of the second power supply control circuit 1043; the control output end of the first power supply control circuit 1042 is connected to the power supply input end of the T-CON board 1022; the control output end of the second supply control circuit 1043 is connected to power supply board 101; the speaker 105 is connected to the main board 104.

The operating principle of the television control circuit of the present disclosure is described hereinafter: when the human body detection module 103 skips detecting characteristic information of users, that means nobody is in front of the television, the human body detection module 103 may output a signal (such as a low electrical level signal) to the main control chip 1041.

According to detection result obtained by the human body detection module 103, the main control chip 1041 may output a signal (such as a low electrical level signal) to the second power supply control circuit 1043, so as to cut off power supply of the power supply board 101 to the drive board 1021 in the display screen 102. Then, the main control chip 1041 may output a signal (such as a low electrical level signal) to the first power supply control circuit 1042, so as to cut off power supply of the main board 104 to the T-CON board 1022 in the display screen 102.

When cutting off power supply of the power supply board 101 to the drive board 1021 in the display screen 102, the drive board 1021 stops working, and then the backlight is closed; when cutting off power supply of the main board 104 to the T-CON board 1022 in the display screen 102, the T-CON board 1022 stops working, the display screen 102 stops working accordingly. Under this circumstance, the television only play sound via the speaker 105, but the display screen 102 stops playing television programs when the human body detection module 103 detects characteristic information of users, that means users are in front of the television to watch programs, the human body detection module 103 outputs a signal (such as a high electrical level signal) to the main control chip 1041 in the main board 104, according to detection result detection result obtained by the human body detection module 103, the main control chip 1041 outputs a signal (such as a high electrical level signal) to the first power supply control circuit 1042, in order to recover power supply of the main board 104 to the T-CON board 1022 in the display screen 102. Thus, the main control chip 1041 outputs a signal (such as a high electrical level signal) to the second power supply control circuit 1043, in order to recover power supply of the power supply board 101 to the drive board 1021 in the display screen 102. And then backlight is opened, the display screen 102 starts working again.

The television control circuit of the present disclosure includes: a display screen 102; a power supply board 101 for supplying power; a human body detection module 103 for detecting characteristic information of users in front of the television; a main board 104 for controlling power supply state of the display screen 102 according to the detection result obtained by the human body detection module 103; the power supply board 101 is connected to the power supply input ends of the main board 104 and the display screen 102; a detection output end of the human body detection module 103 is connected to a detection input end of the main board 104, control output ends of the main board 104 are connected to the power supply board 101 and the display screen 102.

The main board 104 in the television control circuit of the present disclosure may automatically control the power supply state of the display screen 102 according to characteristic information of users in front of the television, obtained by the human body detection module 103. Therefore, the energy-saving is realized.

Further, the television control circuit of the present disclosure has a more simple structure, and can be easily realized.

Figure 2:
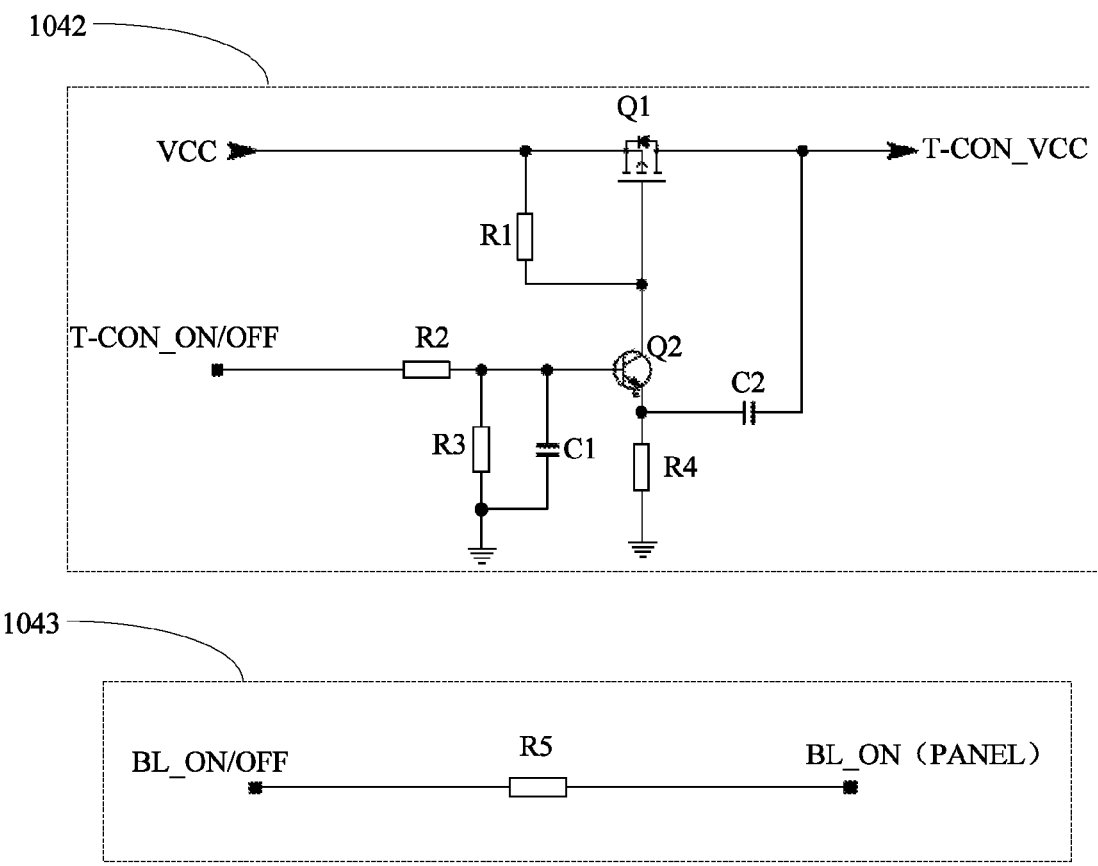
FIG. 2 is a structural diagram of a first power supply control circuit and a second power supply control circuit according to an embodiment of the present disclosure.

FIG. 2 is a structural diagram of a first power supply control circuit and a second power supply control circuit according to an embodiment of the present disclosure.

Referring to FIG. 1 and FIG. 2, the first power supply control circuit 1042 includes a power supply input end VCC, a power supply control input end T-CON_ON/OFF, a power supply control output end T-CON_VCC, a first resistance R1, a second resistance R2, a third resistance R3, a fourth resistance R4, a first capacitance C1, a second capacitance C2, a MOS transistor Q1 and a triode Q2.

Specifically, a first end of the second resistance R2 works as the power supply input end VCC of the first power supply control circuit 1042; the power supply control input end T-CON_ON/OFF is connected to the main control chip 1041 in FIG. 1; the second end of the second resistance R2 is connected to a base of the triode Q2; a first end of the third resistance R3 is connected to the base of the triode Q2; the second end of the third resistance R3 is connected to the ground; the first capacitance C1 and third resistance R3 are in parallel connection; an emitter of the triode Q2 is connected to the ground by passing the fourth resistance R4, and connected to the power supply control output end T-CON_VCC by passing the second capacitance C2; The power supply control output end T-CON_VCC is connected to the power supply input end of the T-CON board 1022; the first end of the first resistance R1 is connected to the power supply input end VCC of the first power supply control circuit 1042, the second end of the first resistance R1 is connected to a collector of the triode Q2; a source of the MOS transistor Q1 is connected to the power supply input end VCC, and a drain of the MOS transistor Q1 is connected to the power supply control output end T-CON_VCC of the first power supply control circuit 1042; a grid electrode of the MOS transistor Q1 is connected to the collector of the triode Q2.

In an embodiment of the present disclosure, the MOS transistor Q1 is a PMOS transistor, and the triode Q2 is a NPN transistor.

In the embodiment of the present disclosure, the second power supply control circuit 1043 includes a control input end BL_ON/OFF; a control output end BL_ON (PANEL); and a fifth resistance R5.

Of which, the first end of the fifth resistance R5 is connected to the control input end BL_ON/OFF that is connected to the main control chip 1041; the second end of the fifth resistance R5 is connected to the a control output end BL_ON (PANEL) that is connected to the power supply board 101.

In the embodiment of the present disclosure, when the human body detection module 103 skips detecting characteristic information of users, that means nobody is in front of the television, the human body detection module 103 may output a signal (such as a low electrical level signal) to the main control chip 1041 in the main board 104. According to detection result obtained by the human body detection module 103, the main control chip 1041 may output a signal (such as a low electrical level signal) to the second power supply control circuit 1043, that is, the control output end BL_ON (PANEL) of the second power supply control circuit 1043 may output a low electrical level signal to the power supply board 101, so as to cut off power supply of the power supply board 101 to the drive board 1021 in the display screen 102. The drive board 1021 stops working once without electricity, and the backlight is closed. Then, the main control chip 1041 may output a low electrical level signal to the power supply control input end T-CON_ON/OFF of the first power supply control circuit 1042, to cut off the NPN transistor Q2, to cut off the PMOS transistor Q1, so as to cut off power supply from the power supply input end VCC to the power supply control output end T-CON_VCC of the first power supply control circuit 1042, that is, cutting off power supply from the main board 104 to the T-CON board 1022 in the display screen 102. Under this circumstance, the T-CON board 1022 stops working, and the display screen 102 stops working as well.

When the human body detection module 103 detects characteristic information of users, that means users are in front of the television to watch TV programs, the human body detection module 103 output a signal (such as a high electrical level signal) to the main control chip 1041 in the main board 104, according to detection result obtained by the human body detection module 103, the main control chip 1041 outputs a signal (such as a high electrical level signal, of the T-CON board 1022) to the power supply control input end T-CON_ON/OFF of the first power supply control circuit 1042; in order to conduct the NPN transistor Q2, to conduct the PMOS transistor Q1, so as to recover power supply from the power supply input end VCC to the power supply control output end T-CON_VCC, the T-CON board 1022 in the display screen 102 starts to work with electricity. Thus, the main control chip 1041 outputs a signal (such as a high electrical level signal, of the drive board 1021) to the control input end BL_ON/OFF of the second power supply control circuit 1043, the control input end BL_ON/OFF may output a high electrical level signal as well; when the control end of the power supply board 101 receives the high electrical level signal, recovering power supply of the power supply board 101 to the drive board 1021 in the display screen 102. The drive board 1021 starts to work and the backlight could be opened, the display screen 102 starts to work again.

In the embodiment of the present disclosure, when the power supply control input end T-CON_ON/OFF of the first power supply control circuit 1042 receives a high electrical level signal, the third resistance R3 may shunt the high electrical level signal, the second resistance R2 and the first capacitance C1 may be combined as a RC circuit for filtering and delay, which may cause the base current of the NPN transistor Q2 remain reasonable, and the change in the base current is not so fast. The second capacitance C2 and the fourth resistance R4 may be combined as a feedback circuit, which may work with the RC circuit to ensure the collector current of the NPN transistor Q2 is changed gently. In addition, the power supply input end VCC provides the grid electrode of the PMOS transistor Q1 that works as a switch, a reference voltage via the first resistance R1 and fourth resistance R4, therefore, the voltage VGS at the grid electrode is bigger than opening threshold voltage of the PMOS transistor Q1, in order to ensure conducting of the PMOS transistor Q1.

Therefore, the first power supply control circuit 1042 of the present disclosure may fulfill timing request of the T-CON board 1022 which is in the prior art and has no need of description herein.

Another embodiment of the present disclosure discloses a television including a television control circuit. As described above, the structure of the television control circuit does not descript herein anymore.

It is understood that, due to the television disclosed in the embodiment adopts the technical solution of the television control circuit, the television includes all the beneficial effects.

The foregoing descriptions are merely embodiments of the present disclosure, and are not intended to limit the scope of the present disclosure. An equivalent structural or equivalent process alternation made by using the content of the specification and drawings of the present disclosure, or an application of the content of the specification and drawings directly or indirectly to another related technical field, shall fall within the protection scope of the present disclosure.

What is claimed is:

1. A television control circuit, comprising:
   a power supply board;
   a display screen;
   a human body detection module; and
   a main board;
   wherein, the power supply board is connected to a power supply input end of the main board and a power supply input end of the display screen, a detection output end of the human body detection module is connected to a detection input end of the main board, control output ends of the main board are connected to the power supply board and the display screen; the main board controls the on-off state of the display screen according to the detection result obtained by the human body detection module that whether a user is watching the television;
   wherein the display screen comprises a drive board and a T-CON board, a power supply input end of the drive board is connected to the power supply board; a power supply input end of the T-CON board is connected to the main board.

2. The television control circuit according to claim 1, wherein the main board comprises:
   a main control chip;
   a first power supply control circuit for controlling power supply state of the T-CON board; and
   a second power supply control circuit for controlling power supply state of the drive board;
   wherein, the detection input end of the main control chip is connected to the detection output end of the human body detection module; control output ends of the main control chip are connected to the control input end of the first power supply control circuit and the control input end of the second power supply control circuit; the control output end of the first power supply control circuit is connected to the power supply input end of the T-CON board; the control output end of the second power supply control circuit is connected to the power supply board.

3. The television control circuit according to claim 2, wherein, the first power supply control circuit comprises:
   a power supply input end;
   a power supply control input end;
   a power supply control output end;
   a first resistance, a second resistance, a third resistance, a fourth resistance, a first capacitance, a second capacitance, a MOS transistor and a triode;
   wherein, a first end of the second resistance works as the power supply input end; the power supply control input end is connected to the main control chip; the second end of the second resistance is connected to a base of the triode; a first end of the third resistance is connected to the base of the triode; the second end of the third resistance is connected to the ground; the first capacitance and third resistance are in parallel connection; an emitter of the triode is connected to the ground by passing the fourth resistance, and connected to the power supply control output end by passing the second capacitance;
   wherein, the power supply control output end is connected to the power supply input end of the T-CON board; the first end of the first resistance is connected to the power supply input end, the second end of the first resistance is connected to a collector of the triode; a source of the MOS transistor is connected to the power supply input end, and a drain of the MOS transistor is connected to the power supply control output end; a grid electrode of the MOS transistor is connected to the collector of the triode.

4. The television control circuit according to claim 3, wherein the MOS transistor is a PMOS transistor, and the triode is a NPN transistor.

5. The television control circuit according to claim 4, wherein the second power supply control circuit comprises a fifth resistance; the first end of the fifth resistance is connected to the main control chip, and the second end of the fifth resistance is connected to the power supply board.

6. The television control circuit according to claim 1, wherein the human body detection module is a shooting system.

7. The television control circuit according to claim 1, wherein the human body detection module is an infrared detection system.

8. The television control circuit according to claim 1, further comprising a speaker for generating sound, the speaker being connected to the main board.

9. A television, comprising:
   a television control circuit;
   wherein the television control circuit comprises a power supply board, a display screen, a human body detection module, a main board; wherein, the power supply board is connected to a power supply input end of the main board and a power supply input end of the display screen, a detection output end of the human body detection module is connected to a detection input end of the main board, control output ends of the main board are connected to the power supply board and the display screen; the main board controls the on-off state of the display screen according to the detection result obtained by the human body detection module that whether a user is watching the television;

wherein the display screen comprises a drive board and a T-CON board, a power supply input end of the drive board is connected to the power supply board; a power supply input end of the T-CON board is connected to the main board.

10. The television according to claim 9, wherein the main board comprises:
 a main control chip;
 a first power supply control circuit for controlling power supply state of the T-CON board; and
 a second power supply control circuit for controlling power supply state of the drive board;
 wherein, the detection input end of the main control chip is connected to the detection output end of the human body detection module; control output ends of the main control chip are connected to the control input end of the first power supply control circuit and the control input end of the second power supply control circuit; the control output end of the first power supply control circuit is connected to the power supply input end of the T-CON board; the control output end of the second power supply control circuit is connected to the power supply board.

11. The television according to claim 10, wherein the first power supply control circuit comprises:
 a power supply input end;
 a power supply control input end;
 a power supply control output end;
 a first resistance, a second resistance, a third resistance, a fourth resistance, a first capacitance, a second capacitance, a MOS transistor and a triode;

wherein, a first end of the second resistance works as the power supply input end;
 the power supply control input end is connected to the main control chip; the second end of the second resistance is connected to a base of the triode; a first end of the third resistance is connected to the base of the triode; the second end of the third resistance is connected to the ground; the first capacitance and third resistance are in parallel connection; an emitter of the triode is connected to the ground by passing the fourth resistance, and connected to the power supply control output end by passing the second capacitance;
 wherein, the power supply control output end is connected to the power supply input end of the T-CON board; the first end of the first resistance is connected to the power supply input end, the second end of the first resistance is connected to a collector of the triode; a source of the MOS transistor is connected to the power supply input end, and a drain of the MOS transistor is connected to the power supply control output end; a grid electrode of the MOS transistor is connected to the collector of the triode.

12. The television according to claim 11, wherein the MOS transistor is a PMOS transistor and the triode is a NPN transistor.

13. The television according to claim 12, wherein the second power supply control circuit comprises a fifth resistance; the first end of the fifth resistance is connected to the main control chip, and the second end of the fifth resistance is connected to the power supply board.

14. The television control circuit according to claim 9, wherein the human body detection module is a shooting system.

15. The television control circuit according to claim 9, wherein the human body detection module is an infrared detection system.

16. The television control circuit according to claim 9, further comprising a speaker for generating sound, the speaker being connected to the main board.

* * * * *